United States Patent
Holmes et al.

[19]

[11] Patent Number: 6,012,000
[45] Date of Patent: Jan. 4, 2000

[54] SIMPLIFIED ONBOARD ATTITUDE CONTROL BASED ON STAR SENSING

[75] Inventors: Thomas Joseph Holmes, Portola Valley; Sun Hur-Diaz, Sunnyvale; Donald Gamble, Menlo Park; John Higham, Mountain View, all of Calif.

[73] Assignee: Space Systems/Loral, Inc., Palo Alto, Calif.

[21] Appl. No.: 09/006,740

[22] Filed: Jan. 14, 1998

[51] Int. Cl.$^7$ .................................................. G05D 1/00
[52] U.S. Cl. .......................... 701/13; 701/222; 244/171; 250/203.6
[58] Field of Search ........................... 701/13, 222, 226; 244/164, 171; 250/203.6

[56] References Cited

U.S. PATENT DOCUMENTS

| | | | |
|---|---|---|---|
| 4,658,361 | 4/1987 | Kosaka et al. | 701/13 |
| 4,680,718 | 7/1987 | Sasaki et al. | 701/222 |
| 5,177,686 | 1/1993 | Boinghoff et al. | 701/226 |
| 5,745,869 | 4/1998 | van Bezooijen | 701/222 |

OTHER PUBLICATIONS

Liebe, Star Trackers for Attitude Determination, IEEE Aerospace and Elec. Sys. Magazine, vol. 10, Iss. 6, pp. 10–16, Jun. 1996.

Baldini et al., Star–Configuration Searching for Satellite Attitude Computation, IEEE Aerospace and Elec. Sys., vol. 31, Iss. 2, pp. 768–777, Apr. 1995.

Eisenman et al., Real Sky Performance of the Prototype Orsted Advanced Stellar Compass, IEEE Aerospace Applications Conference, Feb. 1996, vol. 2, pp. 103–113.

*Primary Examiner*—Michael J. Zanelli
*Attorney, Agent, or Firm*—Perman & Green, LLP

[57] ABSTRACT

An onboard star tracking system is used to provide continuous attitude data based on a fixed star catalog. An orbital position reference for the sensed star data is estimated from uploaded data. The attitude is calculated based solely on the star sensor data referenced to the estimated orbital position and compared to mission attitude to generate an attitude adjustment.

6 Claims, 2 Drawing Sheets

SIMPLIFIED ONBOARD ATTITUDE CONTROL BASED ON STAR SENSING

BACKGROUND OF THE INVENTION

The system of this application is designed to control the attitude of a satellite. Satellites must be maintained in a predetermined orbit and attitude in order to accomplish the assigned mission which can be surveillance, photography, detection and many others. The orbit and attitude of the satellite must be periodically adjusted to compensate for disturbances which occur in space or for the purpose of changing the mission.

In general, space craft attitude is adjusted by activating actuators, such as, momentum wheels, magnetic torguers, or thrusters in response to an attitude correction signal. The attitude error may be sensed by reference to sensors monitoring the position of the sun, stars and earth relative to the satellite or by onboard inertial sensors such as gyroscopes. The attitude is adjusted to its mission orientation in which the imaging system is pointed at its predetermined target and is maintained in this orientation during orbital flight. During flight the satellite is subject to motions induced by external forces, on board mechanisms or other sources and the attitude control system must continuously monitor and adjust attitude. Attitude control is therefore of primary importance in order to point the satellite to accomplish its mission and to maintain that position with the required accuracy.

It is the purpose of this invention to simplify attitude control and construct a less expensive system by eliminating some of the more expensive processes and components. The system of this invention eliminates the need for reliance on earth sensing and inertial sensing, thereby elliminating an earth sensing system and a gyroscope based inertial sensing system.

SUMMARY OF THE INVENTION

An onboard star tracking system is used to provide continuous attitude data to the attitude control system. A fixed star catalog is stored in memory within the onboard system for comparison to star data sensed by an onboard array. Based on this data, attitude is calculated relative to a known reference frame. Orbital position data is estimated based on initial orbital position data from ground control and modeling algorithms. The estimated orbit data is used as a reference to convert the sensed attitude data to data comparable to mission attitude data. The converted sensed attitude is compared to predetermined mission attitude to generate an attitude adjustment signal for actuation of attitude adjustors.

DESCRIPTION OF THE DRAWING

The invention of this application is described in more detail below with reference to the Drawing in which.

DESCRIPTION OF THE PREFERRED EMBODIMENT

As orbiting satellites have become in wider use, there has arisen a need for less expensive systems. In applications, such as geosynchronous surveillance an array of satellites are launched to cover the target area. With this proliferation of satellites, cost has become a significant factor. The system of this invention is directed to a low cost attitude control system which is predominantly based onhoard the satellite.

Figure 1:
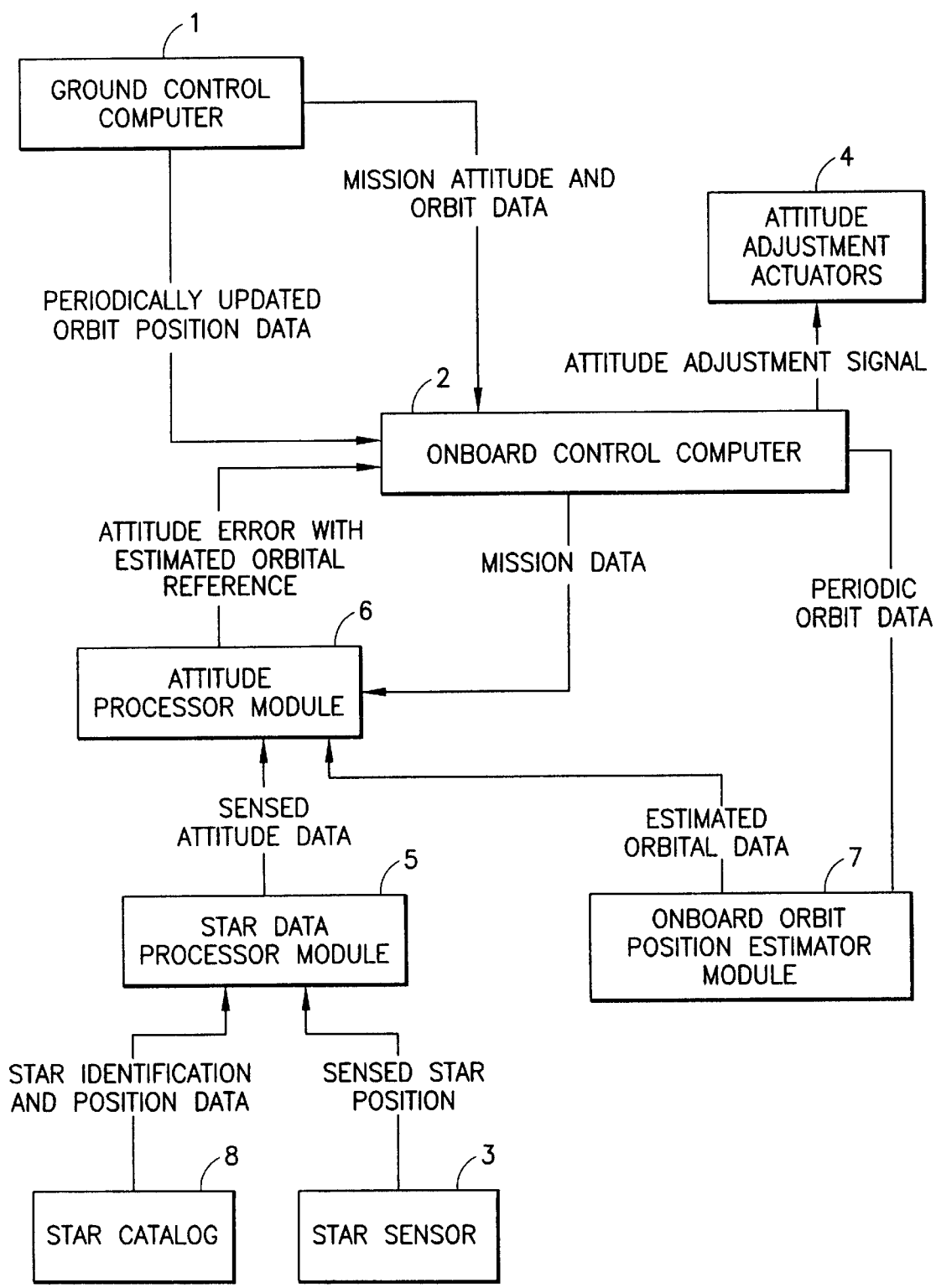
FIG. 1 is a block diagram of the system of this invention.

A block diagram of the system of this invention is shown in FIG. 1. The basic components of the attitude control system include ground control computer 1, onboard control computer 2, star sensor array 3, and attitude adjustment actuators 4. Ground control computer 1 is in microwave communication with the satellite computer 2 and transmits the attitude data required to fulfill the mission for storage in computer 2. The attitude data is related to a specific position reference which depends on the mission. In many instances the application would require that the satellite be earth pointed so that the attitude data would necessarily be relative to orbital position. For simplicity of description orbital position data is used as the position reference in the description that follows. The ground control computer, therefore, must also transmit orbital position data to the onboard computer 2. The orbital position reference will change over time because of the effects of forces which act on the satellite in space. Although the orbital position data may be updated periodically, the data will rapidly deteriorate in accuracy.

Onboard star sensor array 4 comprises a series of CCD (Charge Coupled Device) sensors that continuously track the position of various stars and generate signals relative thereto.

Figure 2:
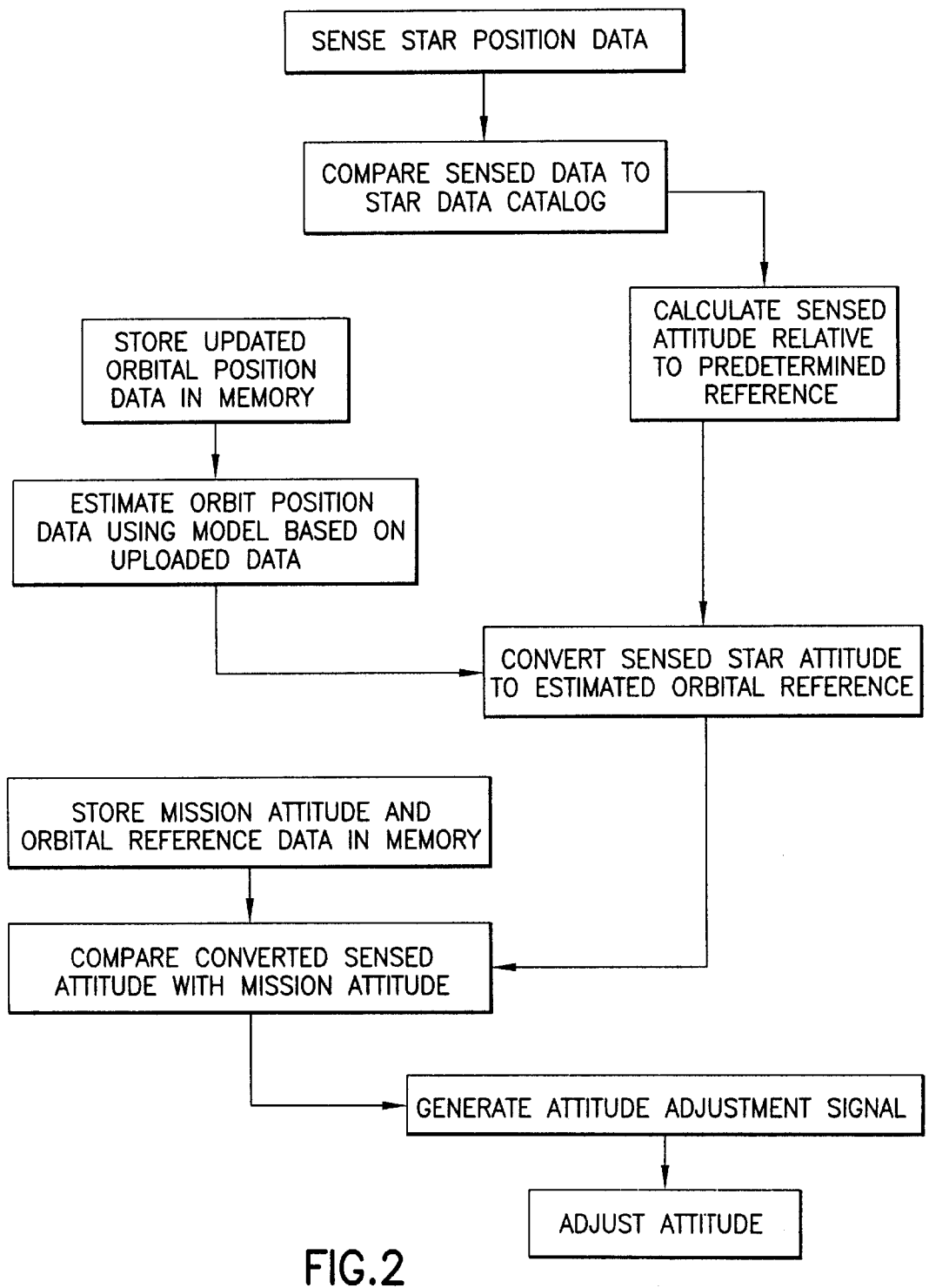
FIG. 2 is a flow diagram of the information processed in the system of this invention.

As indicated in FIG. 2, control computer 2 has stored in its data base a fixed catalog 8 of star identification and position data. The star catalog data is referenced to a predetermined position standard in order to avoid frequent, time consuming, and expensive updating of the star catalog. The sensed data from array 4 is processed in star data process module 5 of computer 2, which compares the sensed data with the star catalog data to calculate the attitude of the satellite. Since the attitude calculated from sensed star data is related to the predetermined position reference, it must be further processed by attitude processor module 6 of onboard computer 2 to he comparable to mission data.

As indicated in FIG. 2, in order to convert the sensed attitude to the mission reference in the absence of current orbital position data from ground control computer 1, it is necessary to estimate the orbital position of the satellite. For this purpose, the onboard control computer 2 is programmed with a modeling algorithm. This algorithm is developed for each particular satellite and mission using known modeling techniques such as those described in U.S. Pat. Nos. 4,688,091 and 4,688,092. This modeling algorithm will allow the orbit position estimator module 7 of onboard computer 2 to calculate an estimated orbital position for the satellite based on the uploaded orbit position data. In this manner a reasonably accurate orbital position reference is generated for use with the attitude calculated from sensed star data. Attitude processor module 6 of onboard computer 1 will combine the estimated orbit position with the star sensor data to allow comparison to mission attitude. Module 6 compares the converted attitude data with the mission data and generates an attitude error signal. Onboard computer computer 2 calculates an attitude adjustment signal which activates the attitude actuators 4. Actuators 4 may be any known system, such as thrusters, momentum wheels, or magnetic torquers.

This system is its ability to estimating a reliable reference for the star sensor attitude data without depending on frequent data uploads from the ground station or complex earth sensors and gyroscopes. This feature greatly simplifies the attitude control system and renders the satellite substantially self reliant. The use of a fixed star catalog also simplifies the maintenance of the star identification and position data. By combining the estimated position reference data with the attitude based on sensed star position data, a current attitude is calculated which can be compared with the mission data to generate an error signal from which the required attitude adjustment can be derived.

We claim:

1. A control system for maintaining the attitude of a satellite in alignment with its mission attitude comprising:

a ground station control computer including means to upload satellite reference position and mission attitude data to a satellite onboard computer;

a star sensor array to instantaneously sense position data of certain stars relative to the position of the satellite;

an onboard satellite control computer including means to receive and store said satellite reference position and attitude data from the ground station computer, said onboard computer further including:

means to store reference position modeling algorithms;

means to process the sensed star position data from the star sensor array and to calculate the satellite attitude based on a predetermined reference;

means to estimate the current satellite reference position based on said uploaded reference position data and said reference position modeling algorithms;

means to convert the sensed satellite attitude to the current estimated reference position;

means to compare the converted attitude to the mission attitude and generate an attitude adjustment signal relative thereto; and attitude actuating means to adjust the attitude of the satellite in response to the attitude adjustment signal.

2. A control system for maintaining the attitude of a satellite in alignment with its mission attitude as described in claim 1 wherein the means to process the sensed star position data from the star sensor array and to calculate the satellite attitude based on a predetermined reference further comprises: means to store a fixed catalog of star identification and position data; means to compare the sensed star position with the catalog data; and means to calculate the attitude of the satellite therefrom.

3. A control system for maintaining the attitude of a satellite in alignment with its mission attitude as described in claim 1 wherein the satellite position reference comprises orbital position.

4. In a satellite including a control system therefore, said control system including a ground station computer and an onboard satellite computer, a method of correcting the attitude of the satellite comprising the steps of:

uploading reference position and mission attitude data from the ground station computer and storing said data in said onboard computer;

storing reference position modeling algorithms in said onboard satellite computer, estimating, in the onboard computer, the reference position of the satellite over a subsequent period based on said uploaded reference position data and said reference position modeling algorithms;

sensing star position data onboard the satellite and supplying said data to the satellite computer;

calculating the attitude of the satellite based on said sensed data;

converting the calculated attitude to reference the estimated reference position;

comparing the converted attitude to the mission attitude data;

generating an attitude correction signal based on the comparison of the converted attitude to the mission attitude data; and adjusting the attitude of the satellite.

5. In a satellite including a control system therefore, said control system including a ground station computer and an onboard satellite computer, a method of correcting the attitude of the satellite as described in claim 4 wherein the step of calculating the attitude of the satellite based on said sensed data comprises the steps of: storing a fixed catalog of star position data; comparing said sensed data with said catalog data; and calculating the attitude of the satellite based on a predetermined reference.

6. In a satellite including a control system therefore, said control system including a ground station computer and an onboard satellite computer, a method of correcting the attitude of the satellite as described in claim 4 wherein the reference position data stored in the onboard computer comprises satellite orbital position data.

* * * * *